A. W. CASE.
Machine for Husking Corn.
No. 45,387.
Patented Dec. 13, 1864.
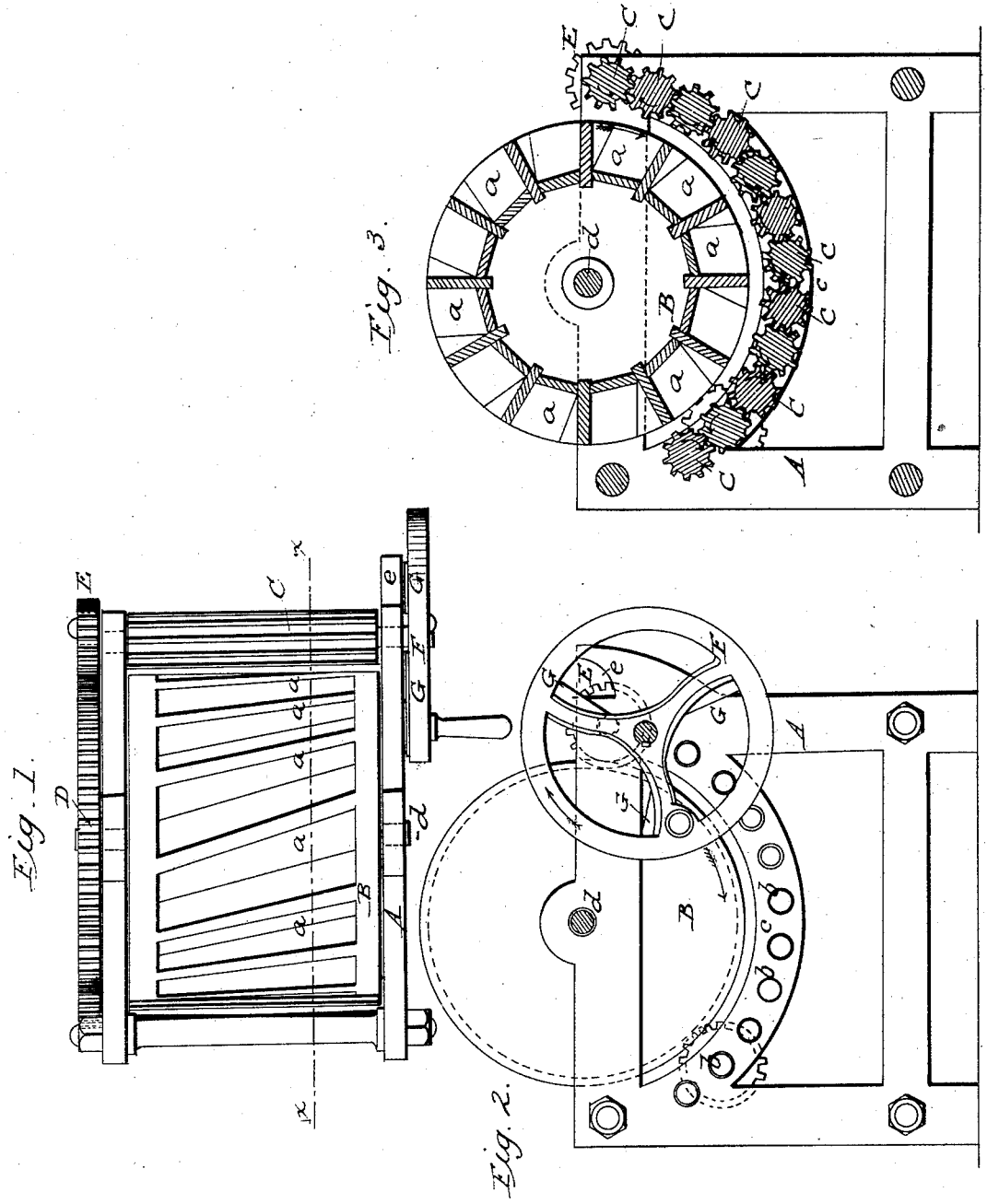

UNITED STATES PATENT OFFICE.

A. W. CASE, OF SOUTH MANCHESTER, CONNECTICUT.

MACHINE FOR HUSKING CORN.

Specification forming part of Letters Patent No. 45,387, dated December 13, 1864.

*To all whom it may concern:*

Be it known that I, A. W. CASE, of South Manchester, in the county of Hartford and State of Connecticut, have invented a new and Improved Corn-Husking Machine; and I do hereby declare that the following is a full, clear, and exact description thereof, which will enable those skilled in the art to make and use the same, reference being had to the accompanying drawings, forming part of this specification, in which—

Figure 1, Sheet No. 1, is a plan or top view of my invention; Fig. 2, Sheet No. 2, a side view of the same; Fig. 3, a longitudinal vertical section of the same, taken in the line $x\ x$, Fig. 1.

Similar letters of reference indicate corresponding parts.

This invention relates to a new and improved machine for stripping husks from the ears of corn after the latter have been detached from the stalks.

The invention consists in the employment or use of a revolving hopper to receive the ears of corn in connection with a concave of fluted rollers and a cutting-wheel, all being combined and arranged in such a manner as to operate in a very expeditious and perfect manner to effect the desired end.

A represents a rectangular frame, in the upper part of which there is fitted a revolving hopper, B, the same being composed of a wheel having a series of oblique or diagonal boxes, $a$, at its periphery. (Shown in Figs. 1 and 3.) The boxes $a$ are of sufficient dimensions to receive each an ear of corn with the husk upon it. Below the hopper B there is a concave of fluted rollers, C, which gear into one another and have their journals $b$ fitted in semicircular bars or side pieces, $c\ c$, at the sides of the frame A. These rollers C extend around nearly the lower half of the hopper B at a short distance from it, as shown clearly in Fig. 3.

The axis $d$ of the hopper B has a toothed wheel, D, on one end of it, which gears into a pinion, E, on the axis of the fluted roller C at one end of the concave, and on the axis of the same fluted roller at its opposite end there is keyed a wheel, F, having knives G attached to it, (three, more or less,) said knives, as the wheel F is rotated, working over a recess, $e$, at the side of the frame A. (Shown in Figs. 1 and 2.)

The operation is as follows: Motion is given the machine by applying power to the wheel F, the hopper and fluted rollers rotating in the direction indicated by the arrows. The ears of corn are grasped one at a time by the operator and their butts placed in the recess $e$ of the frame A so that the knives G will cut them off. The husks of an ear of corn, it will be understood, are attached to its butt and when that is severed from the butt the husks will be loose on the ear. The ears of corn, as their butts are cut off, are placed in the boxes $a$ of the hopper B, and as the latter rotates are carried around over the fluted rollers C, which strip the husks from the ears.

The oblique position of the boxes $a$ prevents the ears of corn from lodging between the rollers C, insuring a smooth passage of the ears over the entire surface of the concave.

I claim as new and desire to secure by Letters Patent—

1. The revolving hopper B, composed of a series of boxes, $a$, at the periphery of a wheel, in combination with the concave of fluted rollers C, all arranged to operate in the manner substantially as and for the purpose herein set forth.

2. The cutter-wheel F, when used in connection with the revolving hopper B and concave of fluted rollers C, for the purpose specified.

3. Having the boxes $a$ of the hopper B placed in an oblique position, so that the ears of corn will be prevented from lodging or catching between the rollers, as herein described.

A. W. CASE.

Witnesses:
C. F. CASE,
WILLARD A. CASE.